Patented Dec. 23, 1952

2,623,047

UNITED STATES PATENT OFFICE 2,623,047

ACRIDONE VAT DYESTUFFS

Werner Zerweck and Ernst Heinrich, Frankfort on the Main-Fechenheim, Germany, assignors to Cassella Farbwerke Mainkur, Frankfort on the Main-Fechenheim, Germany No Drawing. Application May 22, 1951, Serial No. 227,750. In Germany June 9, 1950

2 Claims. (Cl. 260—277)

This application relates to new vat dyestuffs.

It is already known that blue vat dyestuffs are obtained by introducing benzoyl groups into 3.4-phthaloyl-2-amino-acridone.

Now it has been found that in contradistinction thereto the 3.4-phthaloyl-2-hydroaroyl-amino - 8 - chloro-acridones represent valuable grey vat dyestuffs.

According to the present invention these dyestuffs are obtained by subjecting 4(2'-carboxy-3' - chloro - phenyl) - amino - 1 - amino - anthraquinone, or its substitution products or functional derivatives, eventually in the form of their 2-sulfonic acids, to the formation of the acridone nucleus and by acylating the 1-amino-group, before or after cyclisation, with hydroaroyl groups.

As hydroaroyl groups may be named hexahydrobenzoyl and its substitutive derivatives, for instance, the methylhexahydrobenzoyl groups.

The dyestuffs thus obtained dye and print cellulosic materials from the vat grey shades of very good fastness properties. They are especially distinguished by the fact that their dyeings and printings on various cellulosic fibre materials show the same shades, whereby the dyestuffs are greatly suitable for dyeing and printing of union fabrics.

The following example illustrates this invention, the parts being by weight.

Example 37 parts of 3.4-phthalyl-2-amino-8-chloracridone (obtained from 1-amino-4-bromanthraquinone-2-sulfonic acid and 6-chloro-2-amino-benzoic acid according to known methods) are heated with 40 parts of hexahydro-benzoyl-chloride in 500 parts of monochloro-benzene to 120° C. for 12 hours. After cooling, the dyestuff produced is filtered off by suction, washed with monochloro-benzene and methanol and then dried. It corresponds to the formula:

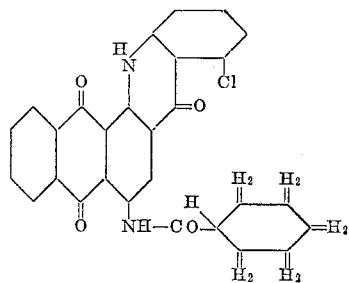

With concentrated sulfuric acid it forms an orange colored solution and dyes the fibre from the vat bluish gray shades. These dyeings have very good fastness properties.

The same dyestuff is obtained by condensing 4-amino-1-hexahydro-benzoylamino-anthraquinone with the methyl ester of 2-bromo-6-chlorobenzoic acid by means of anhydrous potassium acetate in the presence of copper salts and converting the obtained methyl ester of 1-hexahydro-benzoylamino-4-(3'-chlorophenyl)-aminoanthraquinone-2'-carboxylic acid, having the formula:

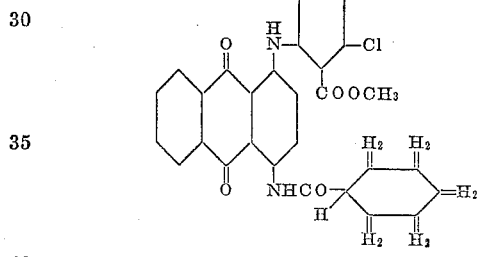

in a hydrosulfite vat into the corresponding acridone. The dyestuff thus obtained dyes the fibre from a vat the same shades and with the same fastness properties as does the dyestuff described before.

Similar dyestuffs are obtained when hexahydrobenzoylchloride in this example is replaced by its substitution products, for instance by 4-methylhexahydrobenzoylchloride.

We claim:
1. The vat dyestuffs corresponding to the formula:

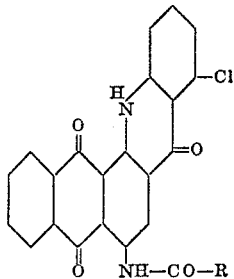

wherein R means a fully hydrogenated hydrocarbon radical of the benzene series, which dyestuffs dye vegetable fibers grey shades of a good fastness.

2. The vat dyestuff of the formula:

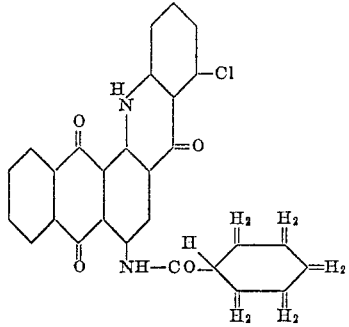

which dyestuff dissolves in concentrated sulfuric acid to an orange solution and dyes vegetable fibers bluish grey shades.

WERNER ZERWECK.
ERNST HEINRICH.

No references cited.